(12) United States Patent
Biagé et al.

(10) Patent No.: US 7,830,863 B2
(45) Date of Patent: Nov. 9, 2010

(54) VOICE OVER INTERNET PROTOCOL CALL CONTINUITY

(75) Inventors: Daniel Biagé, Hull (CA); Sébastien Demers, Gatineau (CA)

(73) Assignee: Solacom Technologies Incorporated, Gatineau (CA)

( * ) Notice: Subject to any disclaimer, the term of this patent is extended or adjusted under 35 U.S.C. 154(b) by 1348 days.

(21) Appl. No.: 11/072,262

(22) Filed: Mar. 7, 2005

(65) Prior Publication Data

US 2006/0198360 A1 Sep. 7, 2006

(51) Int. Cl.
*H04L 12/66* (2006.01)
*H04W 40/00* (2009.01)
(52) U.S. Cl. .................................... 370/352; 455/445
(58) Field of Classification Search ................. 455/445; 370/352–356
See application file for complete search history.

(56) References Cited

U.S. PATENT DOCUMENTS

| | | | |
|---|---|---|---|
| 6,363,065 B1 * | 3/2002 | Thornton et al. | 370/352 |
| 6,389,119 B1 * | 5/2002 | McBride | 379/93.01 |
| 6,606,505 B1 * | 8/2003 | Chow et al. | 455/555 |
| 6,868,080 B1 * | 3/2005 | Umansky et al. | 370/354 |
| 7,054,327 B2 * | 5/2006 | Hagirahim et al. | 370/410 |
| 7,065,363 B1 * | 6/2006 | Pruuden et al. | 455/445 |
| 7,099,280 B1 * | 8/2006 | Shaffer et al. | 370/252 |
| 7,715,312 B2 * | 5/2010 | Khasnabish et al. | 370/230 |
| 2006/0142010 A1 * | 6/2006 | Tom et al. | 455/445 |

* cited by examiner

*Primary Examiner*—Curtis Kuntz
*Assistant Examiner*—Mohammad Islam
(74) *Attorney, Agent, or Firm*—Mark Sprigings; Gowling Lafleur Henderson

(57) ABSTRACT

An apparatus and a method for providing call continuity to a VoIP terminal user responsive to degrading call quality. The quality of a VoIP call is assesses by monitoring the quality of the corresponding IP packet traffic using conventional IP packet quality measures such as, for example, jitter, packet loss and packet delay. When a quality trend indicator crosses a predetermined threshold, a continuity call is originated to the user from a mechanism connected to the IP network. The continuity call uses a connection infrastructure different from the one used by the VoIP terminal such as, for example, a mobility infrastructure (cellular), a wireline infrastructure, a wireless data protocol infrastructure or other similar infrastructure. The continuity call is connected to the user, the original call is bridged with the continuity call and the leg of the original call to the user is dropped.

30 Claims, 3 Drawing Sheets

VOICE OVER INTERNET PROTOCOL CALL CONTINUITY

FIELD OF INVENTION

The present invention relates to the field of voice over internet protocol (VoIP) telephony. In particular, to an apparatus and a method for VoIP call continuity.

BACKGROUND

The use of voice over internet protocol (VoIP) in telephony is growing as the benefits of doing so are becoming more recognized and as suitable telecom equipment becomes available. Initially VoIP was typically used within the telecom network with the call terminations being implemented using traditional analogue and digital telephony technologies. Now, more call terminals (e.g. handsets) are VoIP capable with IP packets originating and terminating directly in the terminal itself.

Similarly, a number of short-range, relatively low-power wireless data protocols have been specified and the equipment needed to implement them have become available and affordable. These include many variants of IEEE 802.11 (also known as Wi-Fi®), IEEE 802.16 (also known as WiMAX™), Bluetooth® and other similar wireless data protocols.

Combining one of the above wireless data protocols with a VoIP terminal results in a VoIP cordless telephone that can be used in a coverage zone (cell) supported by a wireless base-station for that wireless data protocol. Communications between the VoIP cordless telephone and the wireless base-station take the form of IP packages. The base-station can interface with other conventional IP capable devices (e.g. a DSL modem, cable modem) in order to connect to a VoIP gateway and ultimately to a telephony network (e.g. a public switched telephony network (PSTN)) for placing and receiving calls. As the VoIP cordless telephone moves in and beyond the wireless base-station cell, the quality of the telephony transmission can degrade and the connection can be lost due to diminishing signal strength, interference, obstacles and other similar factors.

Degradation of the quality of the telephony transmission can also be caused by factors affecting the IP infrastructure directly such as, for example, traffic congestion in the IP infrastructure (e.g. the IP network), equipment degradation and failures in the IP infrastructure, and other similar sources of degradation. Therefore, telephony transmission quality degradation and loss of connection can affect not only VoIP cordless telephones but also other types of VoIP terminal devices.

What is needed are an apparatus and a method for VoIP call continuity that mitigates the effect of the above described sources of telephony transmission quality degradation and loss of connectivity.

SUMMARY OF INVENTION

An apparatus and a method for providing call continuity to a VoIP terminal user responsive to degrading call quality. A mechanism in communications with an IP network infrastructure assesses the quality of a VoIP call by monitoring the quality of the corresponding IP packet traffic using conventional IP packet quality measures such as, for example, jitter, packet loss and packet delay. When a quality trend indicator crosses a predetermined threshold, a continuity call is originated to the user from a mechanism connected to the IP network. The continuity call uses a connection infrastructure different from the one used by the VoIP terminal such as, for example, a mobility (cellular) infrastructure, a wireline infrastructure, a wireless data protocol infrastructure or other similar infrastructure. The continuity call is connected to the user, the original call is bridged with the continuity call and the leg of the original call to the user (i.e. to the VoIP terminal) is dropped. The call connection to the user is thereby transferred to the connection established by the continuity call thus the user and any other call parties remain connected. The terminal device for the continuity call can be incorporated into a hybrid form of the VoIP terminal or it can be a separate device such as, for example, a mobile (cellular) phone, a wireline terminal, another VoIP terminal or other similar terminal device.

In accordance with one aspect of the present invention, an apparatus for providing call continuity for a telephony call having a party participating in the call via a voice over internet protocol (VoIP) terminal, the apparatus comprising: a quality monitor adapted to assessing a plurality of quality measures for internet protocol (IP) packet traffic associated with the call; a threshold detector adapted to comparing a plurality of quality trend indicators derived from the plurality of quality measures with a plurality of predetermined thresholds to detect a threshold crossing event; a call manager adapted to, responsive to the threshold crossing event, originating a new call leg to a target terminal, bridging the new call leg to the call and releasing a call leg to the VoIP terminal; and a target selector adapted to selecting the target terminal.

In accordance with another aspect of the present invention, a method for providing call continuity for a telephony call having a party participating in the call via a voice over internet protocol (VoIP) terminal, the method comprising the steps of: monitoring quality by assessing a plurality of quality measures for internet protocol (IP) packet traffic associated with the call; detecting a threshold crossing event by comparing a plurality of quality trend indicators derived from the plurality of quality measures with a plurality of predetermined thresholds; selecting a target terminal; and responding to the threshold crossing event by originating a new call leg to the target terminal, bridging the new call leg to the call and releasing a call leg to the VoIP terminal.

In accordance with still another aspect of the present invention, a computer program product for providing call continuity for a telephony call having a party participating in the call via a voice over internet protocol (VoIP) terminal, the computer program product comprising: computer readable program code devices for: monitoring quality by assessing a plurality of quality measures for internet protocol (IP) packet traffic associated with the call; detecting a threshold crossing event by comparing a plurality of quality trend indicators derived from the plurality of quality measures with a plurality of predetermined thresholds; selecting a target terminal; and responding to the threshold crossing event by originating a new call leg to the target terminal, bridging the new call leg to the call and releasing a call leg to the VoIP terminal.

Other aspects and features of the present invention will become apparent to those ordinarily skilled in the art to which it pertains upon review of the following description of specific embodiments of the invention in conjunction with the accompanying figures.

BRIEF DESCRIPTION OF DRAWINGS

The present invention will be described in conjunction with the drawings in which.

DETAILED DESCRIPTION

Figure 1:
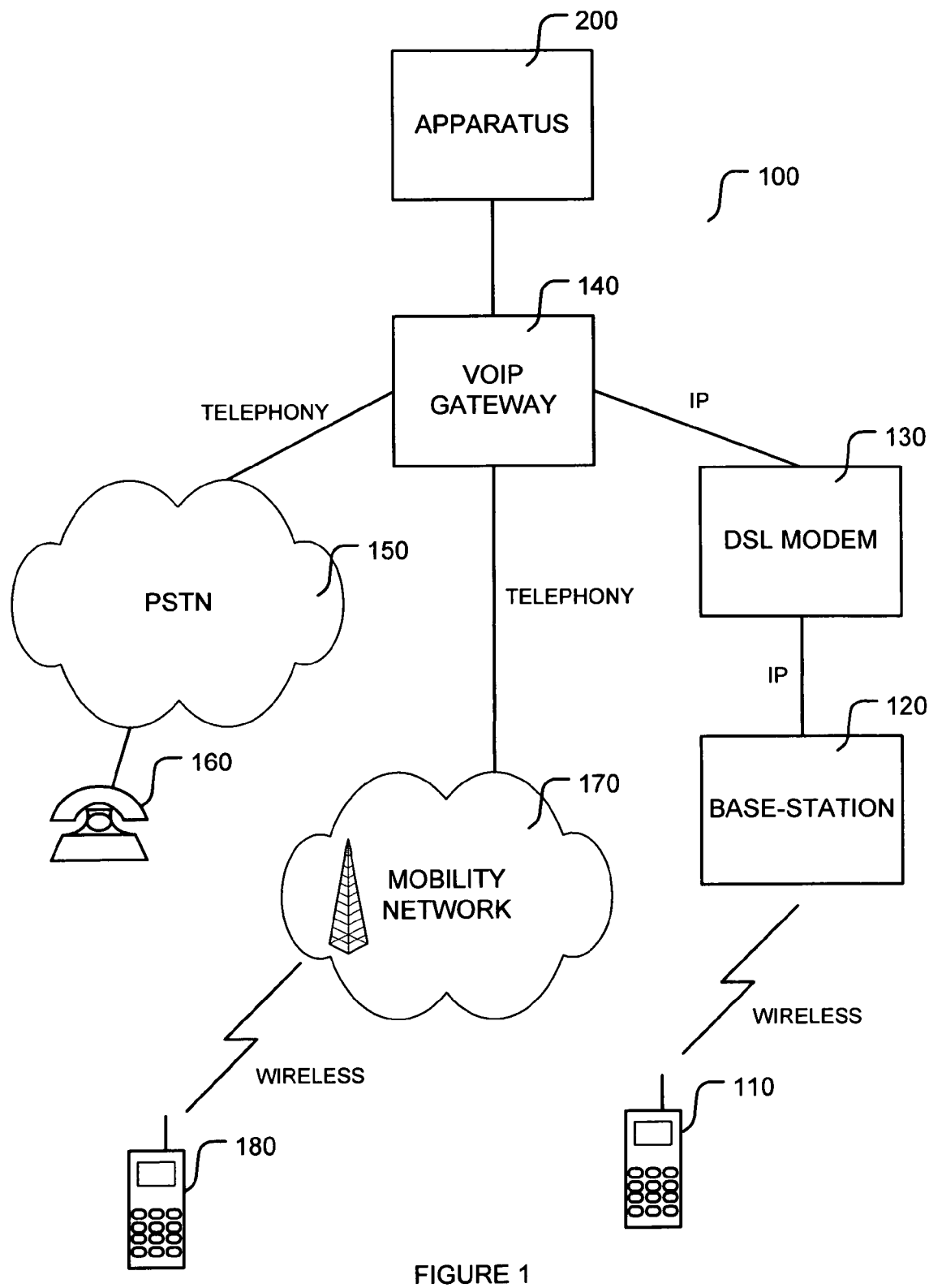
FIG. 1 is a schematic representation of an exemplary telephony environment in which the present invention can be used.

FIG. 1 is a schematic representation of an exemplary telephony environment 100 in which the present invention can be used. The environment 100 includes a VoIP cordless phone 110, a base-station 120, a digital subscriber line (DSL) modem 130, a VoIP gateway 140, a public switched telephone network (PSTN) 150, a wireline terminal device 160, a mobility network 170, a mobile terminal device 180, and an apparatus 200 according to the present invention. The VoIP cordless phone 110 can be a dedicated VoIP telephony terminal or any other type of terminal device that supports VoIP telephony over a wireless data protocol such as, for example, a soft-phone application executing on a computing platform. The base-station 120 provides a coverage zone in which the VoIP cordless phone 110 can communicate with the base-station 120 using the wireless data protocol. The wireless data protocol can be any of the many variants of IEEE 802.11 (also known as Wi-Fi®), IEEE 802.16 (also known as WiMAX™), Bluetooth® and other similar wireless data protocols that can support internet protocol (IP) packet connectivity. The base-station 120 is connected to (i.e. is in communications with) the VoIP gateway 140 using IP. The connection from the base-station 120 to the VoIP gateway 140 can be via the DSL modem 130 or in an alternative telephony environment via a cable modem or any other similar device providing support for IP connectivity. The VoIP gateway 140 is connected to the PSTN 150 and to the mobility network 170. The VoIP gateway 140 can provide gateway services interconnecting a party of a VoIP telephony call to a party or parties in the PSTN 150 and the mobility network 170. In an alternative telephony environment the VoIP gateway 140 can provide gateway services interconnecting a party of a VoIP telephony call to a party or parties in multiple switched telephone networks, mobility networks and other IP networks. The wireline terminal device 160 can connect to the PSTN 150 for originating and terminating telephony calls. The mobile terminal device 180 can connect to the mobility network 170 for originating and terminating telephony calls.

The inclusion of VoIP cordless phone 110 and base-station 120 in environment 100 is purely exemplary. Other types of VoIP terminals can be used in place of VoIP cordless phone 110 while remaining within the scope and spirit of the present invention. For illustrative purposes this description uses VoIP cordless phone 110 as a proxy for other types of VoIP terminals unless stated otherwise.

VoIP cordless phone 110 can be connected to another telephony terminal device such as, for example, wireline terminal device 160 in a telephony call. During the course of the call, the VoIP cordless phone 110 transmits and receives IP packets to and from, respectively, the VoIP gateway 140. The IP packets are carried over the wireless data protocol between the VoIP cordless phone 110 and the base-station 120. As a function of the location and movement of the VoIP cordless phone 110 in the coverage zone provided by the base-station 120, wireless data protocol transmissions between them can be degraded due to diminishing signal strength, interference, obstacles and other similar factors. The degradation of the wireless data protocol transmissions can affect quality parameters associated with the IP packets transmitted and received between the VoIP cordless phone 110 and the VoIP gateway 140.

Degradation of the quality of the telephony call can also be caused by factors affecting the IP infrastructure directly such as, for example, traffic congestion in the IP infrastructure, equipment degradation and failures in the IP infrastructure, and other similar sources of degradation. These sources of degradation can affect the quality parameters associated with the IP packets transmitted and received between the VoIP cordless phone 110 and the VoIP gateway 140.

Figure 2:
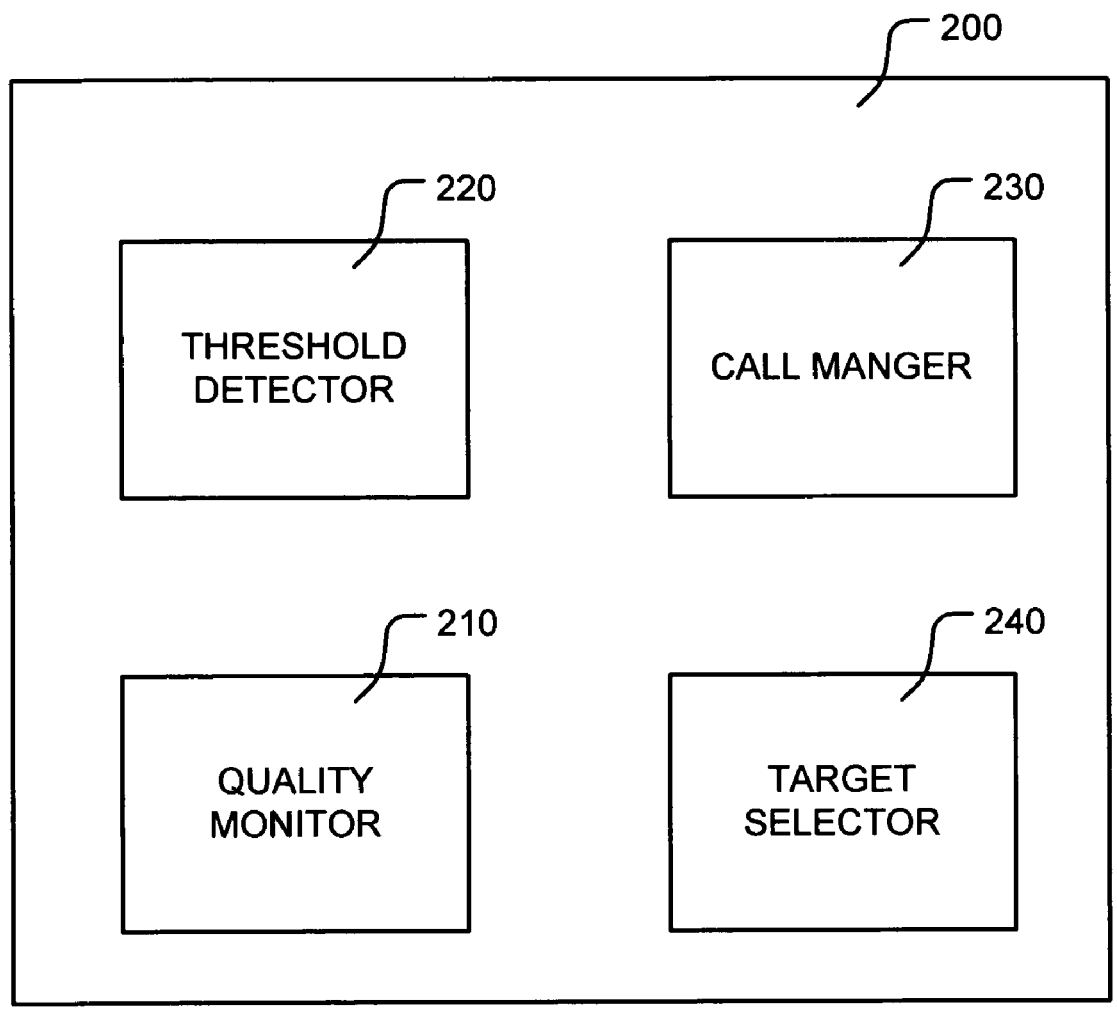
FIG. 2 is a schematic representation of an exemplary embodiment of an apparatus according to the present invention.

FIG. 2 is a schematic representation of an exemplary embodiment of the apparatus 200 according to the present invention. The apparatus 200 comprises a quality monitor 210, a threshold detector 220, a call manager 230, and a target selector 240. The quality monitor 210 assesses the quality of the call by monitoring the quality of the corresponding IP packet traffic using conventional IP packet quality measures such as, for example, jitter, packet loss, packet delay (also known as latency), and other similar IP packet traffic quality parameters. The quality monitor 210 can make the quality measures itself or it can receive them from another device equipped to make such measurements using well known techniques. The quality measurements taken at different times can be recorded, analyzed, and used to derive trend indicators by the quality monitor 210.

The threshold detector 220 compares quality trend indicators with corresponding pre-determined thresholds. The pre-determined thresholds can be a function of the type of codec (for example: G.711, G.723, G.729, and GSM) used to encode and decode the voice carrying IP packets. Heuristic experimentation can be used to establish values for the pre-determined thresholds. Each quality trend indicator can be based directly on one or more of the quality measurements made by the quality monitor 210, trend-lines or slopes based on the quality measurements, other indicators derived from the quality measurements and combinations thereof. The threshold detector 220 detects when one or more of the pre-determined thresholds have been crossed by a corresponding quality trend indicator.

When a quality trend indicator crosses a threshold (e.g. as the VoIP cordless phone 110 moves towards the fringe of the coverage zone), a continuity call is initiated to a target terminal device by the call manager 230. The continuity call uses a connection infrastructure different from that provided by the base-station 120 (i.e. the wireless data protocol) such as, for example, a mobility infrastructure (e.g. mobility network 170), a wireline infrastructure (e.g. PSTN 150), another wireless data protocol infrastructure, or other similar infrastructure. For illustrative purposes this description will assume that a mobility protocol over the mobility network 170 is used unless otherwise stated. The continuity call is connected to the target terminal device, the original call is bridged with the continuity call and the leg of the original call to the VoIP cordless phone 110 is dropped. The original call connected to the VoIP cordless phone 110 is thereby transferred to the connection established by the continuity call such that the target terminal device and any other terminal devices (i.e. other than VoIP cordless phone 110) participating in the original call remain connected.

The target terminal device is selected by the target selector 240. Selection of the target terminal device for the continuity call can be a function of the capability of the VoIP cordless phone 110, the identity of the VoIP cordless phone 110, the identity of the base-station 120, the location of the base-station 120, the proximity/availability of the mobility network 170, other similar factors and combinations thereof. For example, a database can be maintained in which there are records corresponding to a plurality of VoIP cordless phones 10, each record identifying a user-provided target terminal device. The target terminal device for the continuity call can be the VoIP cordless phone 110 in a case where the VoIP cordless phone 110 is a hybrid device, alternatively the target terminal device can be a separate terminal device such as, for example, a mobile (cellular) terminal device 180, a wireline terminal 160, a VoIP terminal or other similar terminal device. The VoIP cordless phone 110 can be a hybrid device when it supports at least one other communications infrastructure (e.g. GSM, CDMA) in addition to the wireless data protocol (e.g. Wi-Fi®).

In an alternative embodiment of the apparatus 200 of the present invention, an indication such as, for example, a tone can be sent to the VoIP cordless phone 110 before the continuity call is originated. In response to the indication, a call party (i.e. user) using the VoIP cordless phone 110 can choose to cancel the continuity call by entering a predetermined key sequence on the VoIP cordless phone 110. After detection of the predetermined key sequence, origination of the continuity call as described above is aborted.

In another alternative embodiment of the apparatus 200 of the present invention, a continuity call can be initiated when the call party using the VoIP cordless phone 110 enters a predetermined key sequence on the VoIP cordless phone 110. The call party can initiate the continuity call even when there is no threshold crossing event. After detection of the predetermined key sequence, the continuity call is originated and completed as described above. This effectively provides a call party initiated call transfer mechanism.

The apparatus 200 can be connected to the VoIP gateway 140. The VoIP gateway 140 can provide support to the apparatus 200 in any of the following: measuring IP packet traffic quality parameters for the IP packet traffic associated with the call, originating a continuity call leg to the target terminal, bridging the continuity call with the original call, dropping the leg of the original call to the VoIP cordless phone 110, and combinations thereof. In an alternative embodiment of the present invention, the apparatus 200 can be incorporated into the VoIP gateway 140.

Figure 3:
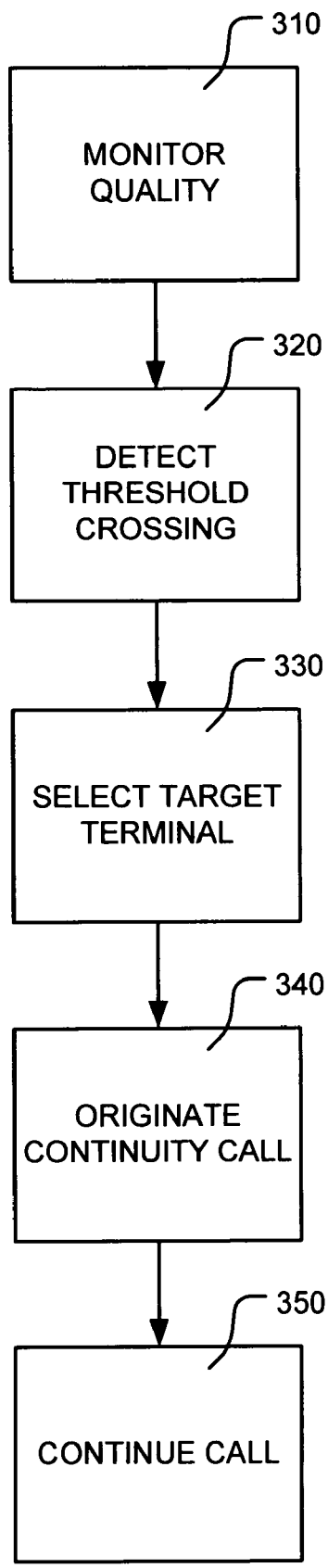
FIG. 3 is a flow diagram representing the steps in a method for VoIP call continuity according to the present invention.

FIG. 3 is a flow diagram representing the steps in a method 300 for VoIP call continuity according to the present invention. The method 300 will be described in the context of a call established in the exemplary environment 100 represented in FIG. 1 and described above. The quality of the call is monitored 310 by assessing the quality of the corresponding IP packet traffic using conventional IP packet quality measures such as, for example, jitter, packet loss, packet delay, and other similar IP packet traffic quality parameters. A threshold crossing is detected 320 when any one of one or more predetermined thresholds is crossed by a corresponding quality trend indicator. Each quality trend indicator can be based directly on one or more of the quality measurements made in step 310, trend-lines or slopes based on the quality measurements, other indicators derived from the quality measurements and combinations thereof. When a quality trend indicator crosses a threshold (e.g. as the VoIP cordless phone 110 moves towards the fringe of the coverage zone), a target terminal for a continuity call is selected 330 and the continuity call is originated 340 to the target terminal. Selection of the target terminal device 330 can be a function of the capability of the VoIP cordless phone 110, the identity of the VoIP cordless phone 110, the identity of the base-station 120, the location of the base-station 120, the proximity/availability of the mobility network 170, other similar factors and combinations thereof. The target terminal device for the continuity call can be the VoIP cordless phone 110 in a case where the VoIP cordless phone 110 is a hybrid device, alternatively the target terminal device can be a separate terminal device such as, for example, a mobile (cellular) terminal device, a wireline terminal, a VoIP terminal, or other similar terminal device. The originated continuity call 340 uses a connection infrastructure different from the wireless data protocol such as, for example, a mobility infrastructure (e.g. mobility network 170), a wireline infrastructure (e.g. PSTN 150), another wireless data infrastructure or other similar infrastructure. The continuity call is connected to the target terminal device, the original call is bridged with the continuity call and the leg of the original call to the VoIP cordless phone 110 is dropped thereby continuing the call 350. The original call connected to the VoIP cordless phone 110 is thereby transferred to the connection established by the continuity call such that the target terminal device and any other terminal devices (i.e. other than VoIP cordless phone 110) participating in the original call remain connected.

The method 300 can be implemented using an apparatus such as, for example, apparatus 200 described above. Alternatively, the method 300 according to the present invention can be implemented by a computer program product comprising computer readable program codes devices.

It will be apparent to one skilled in the art that numerous modifications and departures from the specific embodiments described herein may be made without departing from the spirit and scope of the present invention.

The invention claimed is:

1. An apparatus for providing call continuity for a telephony call between a first party and a second party, the first party participating in the call using a voice over internet protocol (VoIP) terminal, the apparatus comprising:
   a quality monitor adapted to assessing a plurality of quality measures for internet protocol (IP) packet traffic associated with the VoIP terminal;
   a threshold detector adapted to comparing a plurality of quality trend indicators derived from the plurality of quality measures with a plurality of predetermined thresholds to detect a threshold crossing event;
   a call manager adapted to, responsive to the threshold crossing event, originating a new call leg to a target terminal selected from one or more target terminals associated with the first party but providing connectivity to the first party through an infrastructure different to the VoIP terminal, and bridging the new call leg with the call to the second party and releasing a call leg to the VoIP terminal to maintain continuity between the first party and the second party; and
   a target selector adapted to selecting the target terminal to be used to bridge the call to the first party from the one or more target terminals associated with the first party pre-stored in a database.

2. The apparatus of claim 1, wherein the plurality of quality measures are selected from a group consisting of jitter, packet loss, packet delay, and combinations thereof.

3. The apparatus of claim 1, wherein each of the plurality of quality trend indicators is based on at least one quality measure selected from the plurality of quality measures.

4. The apparatus of claim 1, wherein the plurality of predetermined thresholds includes thresholds that are a function of an encoding scheme used to encode voice content in the IP packet traffic associated with the call.

5. The apparatus of claim 1, wherein the target terminal is of a terminal type selected from a group consisting of wireline, mobile, VoIP, and combinations thereof.

6. The apparatus of claim 1, wherein the call manager bridges the new call leg to the call before releasing the call leg to the VoIP terminal.

7. The apparatus of claim 1, wherein the target selector selects the target terminal as a function of one of: a capability of the VoIP terminal, an identity of the VoIP terminal, an identity of a base station with which the VoIP terminal is associated, a location of the base station, a proximity of a mobile network, an availability of the mobile network and combinations thereof.

8. The apparatus of claim 1, wherein the call manager is further responsive to a predetermined key sequence entered at the VoIP terminal.

9. The apparatus of claim 1, wherein the call manager is further adapted to sending a continuity call initiation indication to the VoIP terminal before originating the new call leg and, responsive to a predetermined key sequence entered at the VoIP terminal, taking no further action.

10. The apparatus of claim 1, wherein the VoIP terminal utilizes a wireless protocol that is one of IEEE 802.11, IEEE 802.16, and Bluetooth®.

11. A method for providing call continuity for a telephony call between a first party and a second party, the first party participating in the call using a voice over internet protocol (VoIP) terminal, the method comprising the steps of:
monitoring quality by assessing a plurality of quality measures for internet protocol (IP) packet traffic associated with the VoIP terminal;
detecting a threshold crossing event by comparing a plurality of quality trend indicators derived from the plurality of quality measures with a plurality of predetermined thresholds;
selecting a target terminal to be used to bridge the call to the first party from one or more target terminals associated with the first party pre-stored in a database, the target terminal bridging the call to the first party through an infrastructure different to the VoIP terminal; and
responding to the threshold crossing event by originating a new call leg to the target terminal selected from the one or more target terminals associated with the first party, bridging the new call leg with the call to the second party and releasing a call leg to the VoIP terminal to maintain continuity between the first party and the second party.

12. The method of claim 11, wherein the plurality of quality measures are selected from a group consisting of jitter, packet loss, packet delay, and combinations thereof.

13. The method of claim 11, wherein each of the plurality of quality trend indicators is based on at least one quality measure selected from the plurality of quality measures.

14. The method of claim 11, wherein the plurality of predetermined thresholds includes thresholds that are a function of an encoding scheme used to encode voice content in the IP packet traffic associated with the call.

15. The method of claim 11, wherein the target terminal is of a terminal type selected from a group consisting of wireline, mobile, VoIP, and combinations thereof.

16. The method of claim 11, wherein the new call leg is bridged to the call before releasing the call leg to the VoIP terminal.

17. The method of claim 11, wherein selecting of the target terminal is a function of one of: a capability of the VoIP terminal, an identity of the VoIP terminal, an identity of a base station with which the VoIP terminal is associated, a location of the base station, a proximity of a mobile network, an availability of the mobile network and combinations thereof.

18. The method of claim 11, further comprising the step of:
responding to a predetermined key sequence entered at the VoIP terminal by originating a new call leg to the target terminal, bridging the new call leg to the call and releasing a call leg to the VoIP terminal.

19. The method of claim 11, the step of responding to the threshold crossing event further sending a continuity call initiation indication to the VoIP terminal before originating the new call leg and, responsive to a predetermined key sequence entered at the VoIP terminal, taking no further action.

20. The method of claim 11, wherein the VoIP terminal utilizes a wireless protocol that is one of IEEE 802.11, IEEE 802.16, and Bluetooth®.

21. A non-transitory computer program product for providing call continuity for a telephony call between a first party and a second party, the first party participating in the call using a voice over internet protocol (VoIP) terminal, the computer program product comprising:
computer readable program code devices for:
monitoring quality by assessing a plurality of quality measures for internet protocol (IP) packet traffic associated with the VoIP terminal;
detecting a threshold crossing event by comparing a plurality of quality trend indicators derived from the plurality of quality measures with a plurality of predetermined thresholds;
selecting a target terminal to be used to bridge the call to the first party from one or more target terminals associated with the first party pre-stored in a database, the target terminal bridging the call to the first party through an infrastructure different to the VoIP terminal; and
responding to the threshold crossing event by originating a new call leg to the target terminal selected from the one or more target terminals associated with the first party, bridging the new call leg with the call to the second party and releasing a call leg to the VoIP terminal to maintain continuity between the first party and the second party.

22. The non-transitory computer program product of claim 21, wherein the plurality of quality measures are selected from a group consisting of jitter, packet loss, packet delay, and combinations thereof.

23. The non-transitory computer program product of claim 21, wherein each of the plurality of quality trend indicators is based on at least one quality measure selected from the plurality of quality measures.

24. The non-transitory computer program product of claim 21, wherein the plurality of predetermined thresholds includes thresholds that are a function of an encoding scheme used to encode voice content in the IP packet traffic associated with the call.

25. The non-transitory computer program product of claim 21, wherein the target terminal is of a terminal type selected from a group consisting of wireline, mobile, VoIP, and combinations thereof.

26. The non-transitory computer program product of claim 21, wherein the new call leg is bridged to the call before releasing the call leg to the VoIP terminal.

27. The non-transitory computer program product of claim 21, wherein selecting of the target terminal is a function of one of: a capability of the VoIP terminal, an identity of the VoIP terminal, an identity of a base station with which the VoIP terminal is associated, a location of the base station, a proximity of a mobile network, an availability of the mobile network and combinations thereof.

28. The non-transitory computer program product of claim 21, further comprising computer readable program code devices for:

responding to a predetermined key sequence entered at the VoIP terminal by originating a new call leg to the target terminal, bridging the new call leg to the call and releasing a call leg to the VoIP terminal.

29. The non-transitory computer program product of claim 21, the computer readable program code devices for responding to the threshold crossing event further sending a continuity call initiation indication to the VoIP terminal before originating the new call leg and, responsive to a predetermined key sequence entered at the VoIP terminal, taking no further action.

30. The non-transitory computer program product of claim 21, wherein the VoIP terminal utilizes a wireless protocol that is one of IEEE 802.11, IEEE 802.16, and Bluetooth®.

* * * * *